(12) United States Patent
Wakeman

(10) Patent No.: US 7,896,271 B2
(45) Date of Patent: Mar. 1, 2011

(54) MEDICATION DISPOSAL SYSTEM

(76) Inventor: Ann Wakeman, Portland, OR (US)

( * ) Notice: Subject to any disclaimer, the term of this patent is extended or adjusted under 35 U.S.C. 154(b) by 498 days.

(21) Appl. No.: 11/890,685

(22) Filed: Aug. 6, 2007

(65) Prior Publication Data

US 2009/0039183 A1    Feb. 12, 2009

(51) Int. Cl.
*B02C 19/00* (2006.01)

(52) U.S. Cl. .............. 241/100; 241/101.2; 241/DIG. 27

(58) Field of Classification Search .......... 241/DIG. 27, 241/100, 236, 101.2
See application file for complete search history.

(56) References Cited

U.S. PATENT DOCUMENTS

| | | | |
|---|---|---|---|
| 4,815,670 A * | 3/1989 | Iwai | 241/34 |
| 6,676,050 B2 * | 1/2004 | Chang | 241/37.5 |
| 2003/0006330 A1 * | 1/2003 | Chang | 241/236 |
| 2006/0038048 A1 * | 2/2006 | Lo | 241/100 |
| 2006/0175444 A1 * | 8/2006 | Chen | 241/100 |
| 2007/0080252 A1 * | 4/2007 | Pierce et al. | 241/236 |

* cited by examiner

*Primary Examiner*—Faye Francis
(74) *Attorney, Agent, or Firm*—Mark S. Hubert

(57) ABSTRACT

Medication is disposed of by rending the medication, including medicaments stored in blister packs and transdermal patches, and aggregating the riven medication with a disposal medium that is suitable for burial or incineration. Burial or incineration of the aggregated disposal medium and the riven medication reduces the likelihood of water contamination.

1 Claim, 4 Drawing Sheets

MEDICATION DISPOSAL SYSTEM

CROSS-REFERENCE TO RELATED APPLICATIONS

Not applicable.

BACKGROUND OF THE INVENTION

The present invention relates to a medication disposal system and, more particularly, to a method for disposing of medication and an apparatus for preparing medications for disposal.

Disposal of surplus pharmaceuticals presents a significant problem for the health care industry. For example, recent studies of water and stream bottom sediments reveal that water pollution involves a wide range of contaminants. In addition to more well known contaminants from industrial and agricultural sources, these studies have identified a wide ranging presence of pharmaceuticals in water and stream sediments. For example, a recent report of a study of sediment from streams and rivers in Oregon identified a number of medical chemicals including: antidepressants including venlafaxine, fluoxetine, and citalopram; an antihistamine, diphenhydramine; and diltiazem, a drug used to treat hypertension, angina and certain heart rhythm disorders. The effects of medical contaminants on ecosystems is unknown, but reproductive and behavioral changes in fish are believed to be connected to the presence of waterborne contaminants, including medical contaminants. In addition, it is speculated that the presence of medications in water and stream bed sediments may facilitate development of bacteria and other organisms that are drug resistant. Moreover, in many areas, streams provide drinking water for humans and animals.

Likewise, the sources of medical contaminants in rivers and streams are not fully known. However, it is a common practice to dispose of surplus medications in the sewer system. For example, surplus pills and capsules, resulting from a change in treatment or the death of a patient, are commonly disposed of by flushing down the toilet. Likewise, liquid medication is commonly disposed of in the sewer system. In addition, patients are instructed to dispose of transdermal patches by folding the adhesive sides together and flushing the patch down the toilet. Transdermal patches comprise an adhesive patch that is placed on the skin to deliver a time released dose of medication through the skin and into the bloodstream. In some cases, a used transdermal patch may contain sufficient medication to be a danger to children and small animals and the medication can continue to be released in the sewer. Current waste treatment processes do not remove medications from sewage and the medical chemicals can enter waterways with the treatment effluent.

In addition, the process of disposing of medications can present difficulty and risk to medical personnel. For example, the medication in a transdermal patch is intended to be absorbed through the skin and a person handling used or surplus patches during disposal may be exposed to a substantial dose of the medication. Similarly, liquid medication is commonly withdrawn from a vial with a hypodermic needle and disposed of in the sewer system. The process of emptying vials of medicine with a hypodermic needle can be laborious and presents a risk of injury in addition to the risk of environmental contamination resulting from disposal in the sewer system.

What is desired, therefore, is a medication disposal system and method that reduces the potential for environmental contamination and injury to persons disposing of drugs.

DETAILED DESCRIPTION OF PREFERRED EMBODIMENTS

Medications take several forms, are delivered by a number of mechanisms and are stored in a variety of containers. Medicine may be ingested in the form of liquids, pills or capsules, a digestible gelatinous container with the medicament inside. Pills and capsules may be stored in bottles but are frequently stored in blister packs, comprising a preformed plastic blister which is typically sealed to a paper board card. Liquid medications may be stored in bottles but some liquid medications are stored in sealed vials for delivery to the patient by injection. Other medications are dispensed with an adhesive transdermal patch. When the adhesive patch is applied to the skin, the medicament, which may be in the adhesive patch or a reservoir affixed to the patch, is absorbed through the skin. The inventor considered the wide variety of storage and delivery means for medication and concluded that environmental contamination and exposure to medication during disposal could be reduced if, with minimal contact with persons disposing of the medication, the medication could shredded, crushed, pulverized or otherwise rended, aggregated with a disposal medium suitable for placement in a landfill or for incineration and then, appropriately, buried or incinerated.

Figure 1:
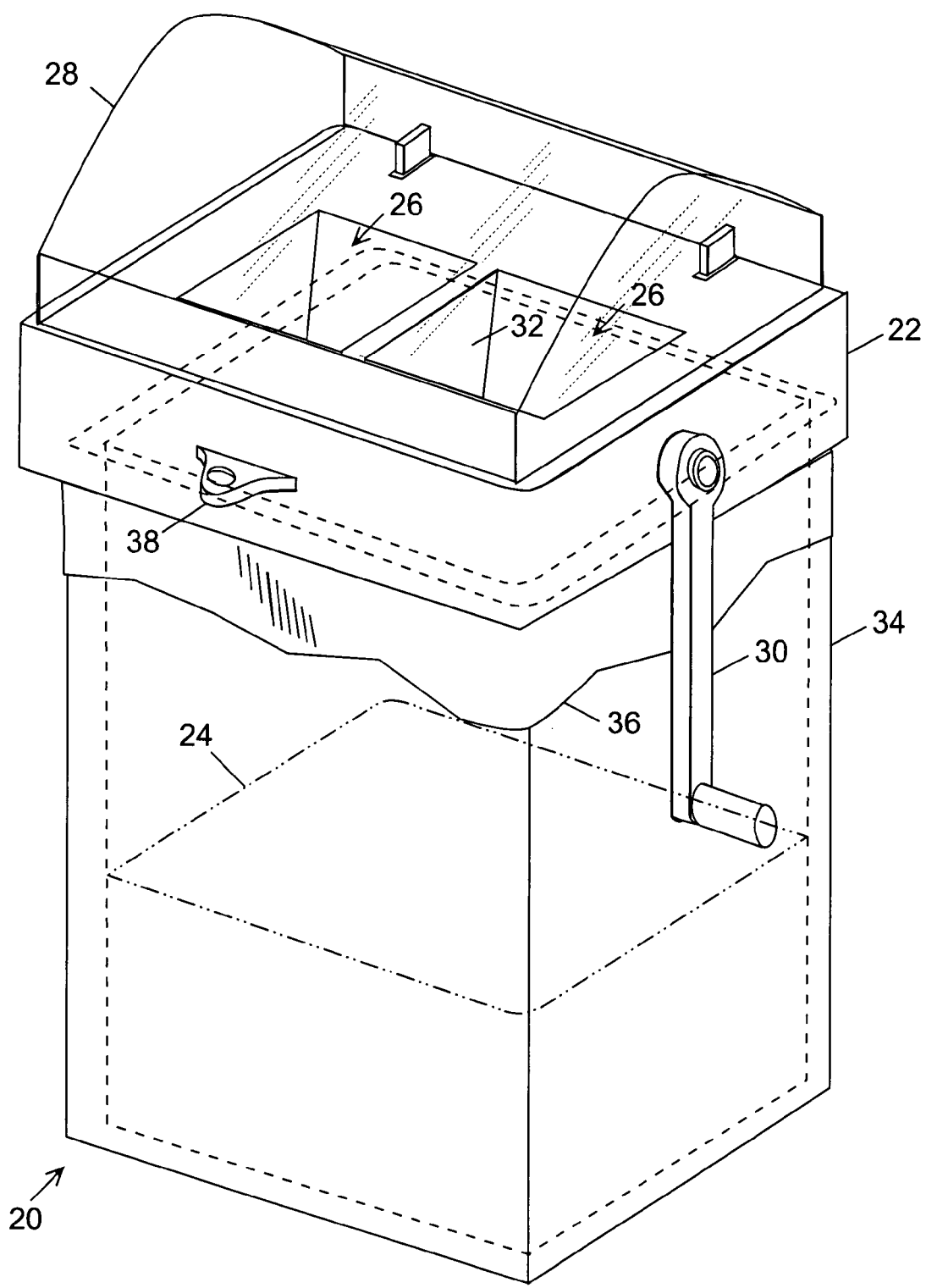
FIG. 1 is a perspective view of an apparatus for preparing medications for disposal.

Referring in detail to the drawings where similar parts are identified by like reference numerals, and, more particularly to FIG. 1, a medication disposal apparatus 20 comprises, generally, a shredder or hog 22 for rending pills, capsules and other solid medications; blister packs, transdermal patches and similar material and a quantity of a disposal medium 24 that is arranged to be aggregated with the rent medication that is being discarded. The hog includes a hopper 26 into which medications are placed in preparation for disposal. A hinged shield 28 can be opened to facilitate placing material in the hopper and closed to provide protection for personnel from material in the hopper during rending by the hog.

Figure 2:
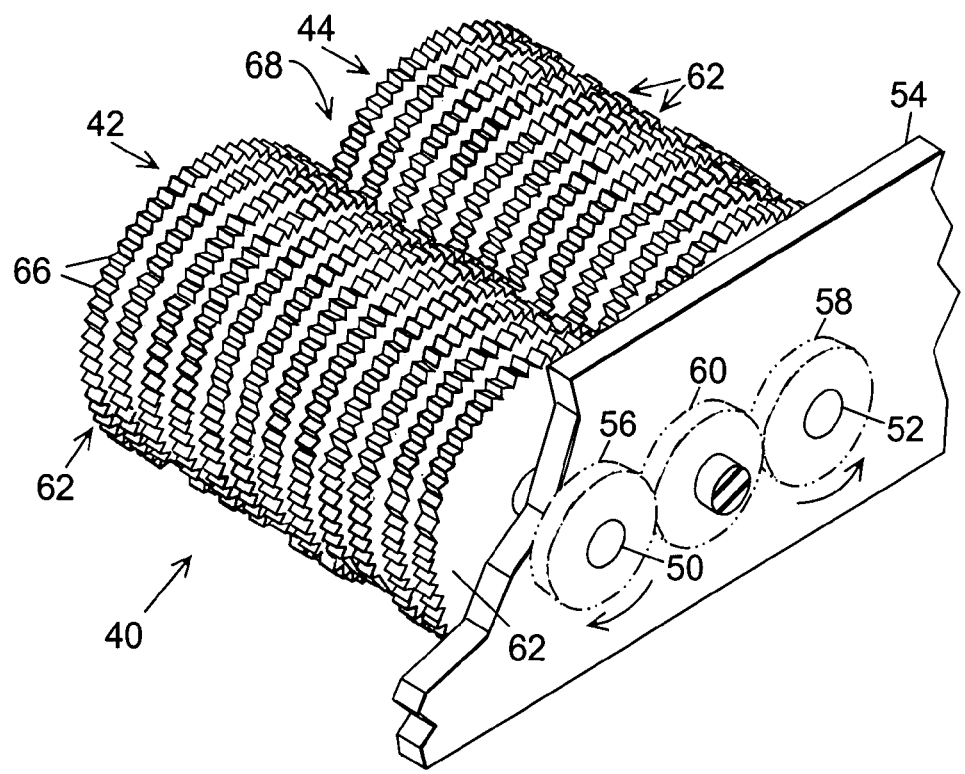
FIG. 2 is a perspective view of a portion of a hog for rending medications.
Figure 3:
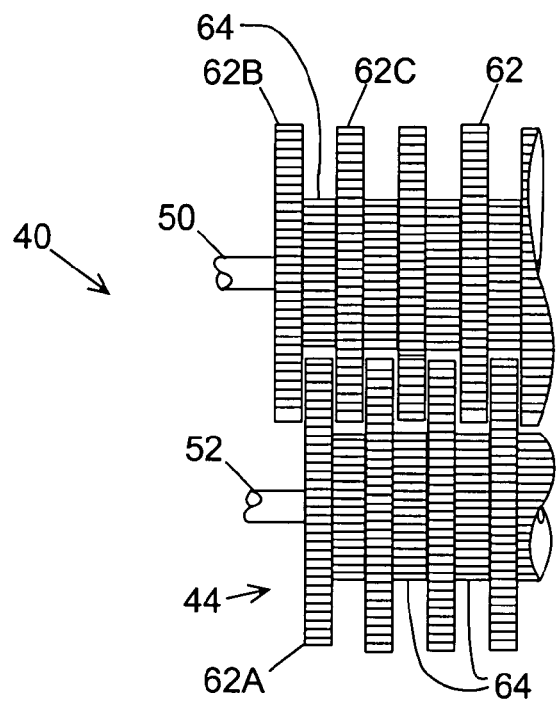
FIG. 3 is a top view of a portion of a hog.

Referring to also FIGS. 2 and 3, the hog comprises generally a pair of rending elements 42, 44 that are counter rotatable to draw medication from the hopper, rend the medication and expel the medication into the disposal medium 24. An exemplary hog 40 comprises a pair of parallel shafts 50, 52 rotationally secured in a frame 54. The shafts may be rotated in opposing directions by belts, independent motors or other means. Preferably, gears 56, 58, affixed to the respective shafts, enable rotation of the shafts in opposing directions by rotation of a central pinion gear 60 that is rotatably mounted to the frame. The pinion gear can, in turn, be rotated by a crank 30 or by a motor.

The exemplary hog 40 comprises a plurality disks arranged along portions of the shafts 50, 52 and affixed to one of the shafts for rotation by the respective shaft. The disks comprise spaced pairs of larger diameter disks 62 that are separated by a smaller diameter disk 64. The disks are arranged on the shafts so that the periphery of a larger diameter disk on one shaft, for example disk 62A rotatable by shaft 52, overlaps the peripheries of two spaced apart larger diameter disks, for example disks 62B and 62C, rotatable on the second shaft 50 so that a portion of disk 62A moves between the spaced apart faces of the other two disks when the disks are rotated. The axial length of the smaller diameter disks 64 is chosen so that there is little axial clearance between adjacent faces of the larger diameter disks. Medications included in sheet-like artifacts, such as blister packs and transdermal patches, having substantial lengths and widths, typically substantially greater than the artifact's thickness, will be shredded by the interaction of the overlapping closely spaced larger disks. A plurality of teeth 66 are preferably formed on the peripheries of the disks to engage sheet-like material, such as transdermal patches, and pull the material into the throat 68 of the hog, the area between the counter rotating shafts, where the material will be shredded. Medications, such as pills and capsules, entering the throat of the hog will be pulverized by the teeth on the rotating disks 62, 64.

Figure 4:
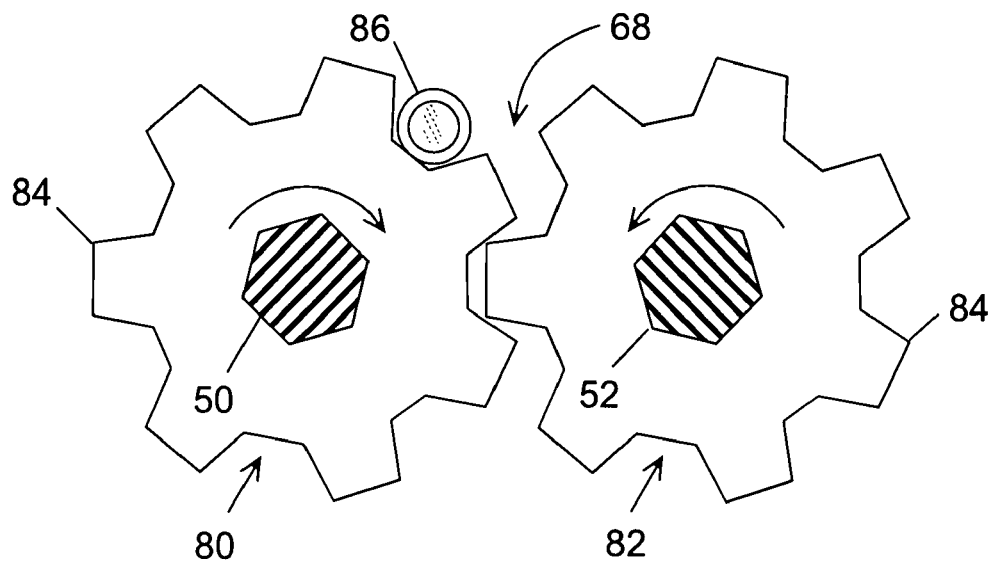
FIG. 4 is an end view of intermeshing cogged rollers for an alternative construction of a medication rending hog.

The hog may comprise other mechanisms for crushing, pulverizing or shredding medications and packaging. Referring to FIG. 4, the rending elements of the hog may, for example, comprise rollers 80, 82 affixed the respective shafts 50, 52 for rotation. The rollers are arranged so that the peripheries are in contact or proximate at the throat 68 to crush medications drawn be between the rollers by counter-rotation. FIG. 4, illustrates rollers 80, 82 having cogs 84 or teeth around their peripheries. The cogs of the rollers intermesh when the rollers are rotated and medication, such as pills, deposited in the hopper are drawn into the areas between cogs and crushed by the intermeshing cogs. If the cogs are spaced apart sufficiently, containers, such as a vial 86 for liquid medications, may be crushed between the cogged rollers.

The hog may comprise a plurality of sections each incorporating a different type of rending element. For example, a plurality of toothed disks 62, 64 may be affixed to a first portion of the axial length of the shafts 50, 52 and cogged rollers 80, 82 may be affixed for rotation to a second portion of the axial length of the shafts 50, 52. The hopper may be divided by one or more internal walls 32 to direct material to the different portions of the hog.

Material to be disposed of, including pills, capsules, blister packs and transdermal patches, is placed in the hopper(s) where sloping sides will direct the material toward the throat 68 of the hog. The peripheral surfaces of the counter rotating rending elements of the hog, for example toothed disks or cogged rollers, forces the material between the rotating elements where it is torn, shredded or pulverized. The rent material is expelled from the hog by the rotation of the rending elements, through the open end of a container and into a quantity of the disposal medium 24 in the container. The container may comprise a rigid canister 34 which is preferably lined with a disposable sack or bag 36 containing the disposal medium. The hog may be supported on the upper rim of the rigid canister or may be supported above the canister by separate frame. On the other hand, the hog may be supported by a frame and the container may comprise a bag or sack containing the disposal medium which is secured below the hog with the open end of the bag attached to the frame or the hog and arranged to receive the rended material from the hog.

The disposal medium 24 comprises a medium suitable for burial in a landfill and/or incineration. Preferably, the disposal medium absorbs liquids and may comprise a gel that absorbs liquids and pulverized solid medications. A preferred disposal medium for burial comprises cat litter. A preferred medium for disposal by incineration comprises shredded paper, such as shredded newsprint, which will absorb liquid and provides fuel for incinerating the aggregated disposal medium and rent medication waste. The disposal medium is preferably contained within a bag or container, such as a paper bag, which may be treated or lined to prevent liquids from leaking out of or weakening the bag and which is disposable by burial and/or incineration with the disposal medium. Burial in a landfill or incineration reduces the risk of medical contaminants entering waterways.

Figure 5:
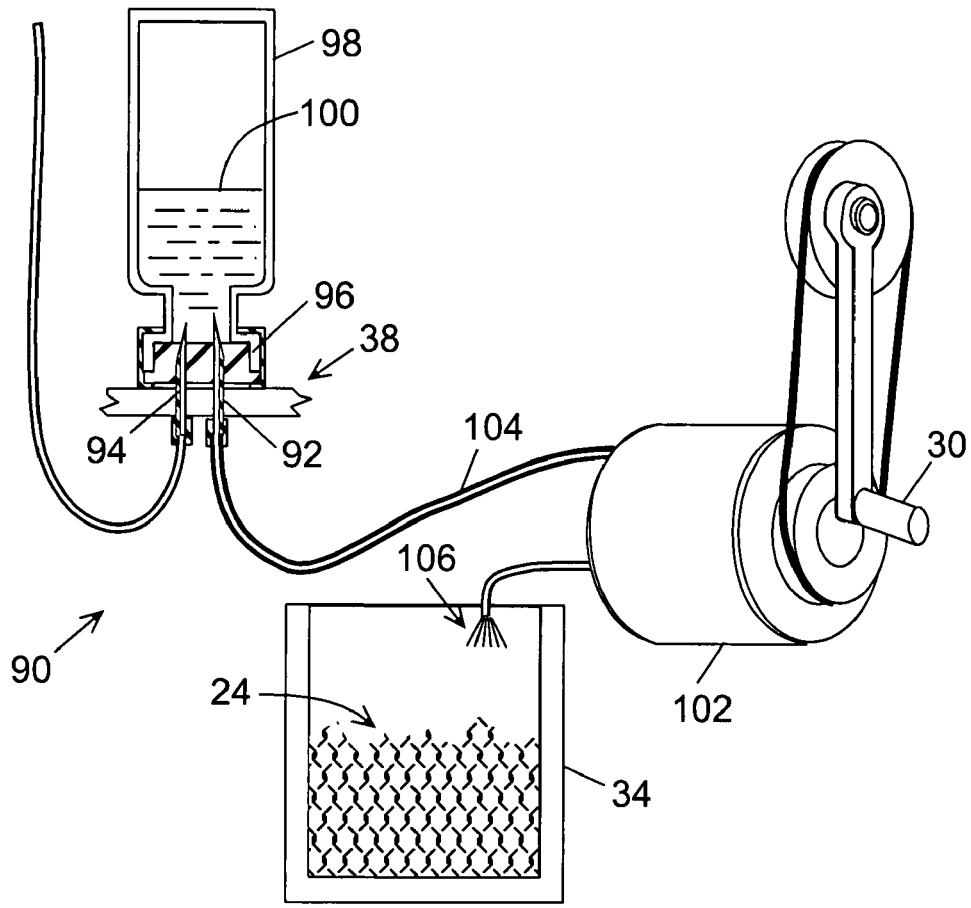
FIG. 5 is a schematic illustration of system for removing liquid medication from a vial.
Figure 6:
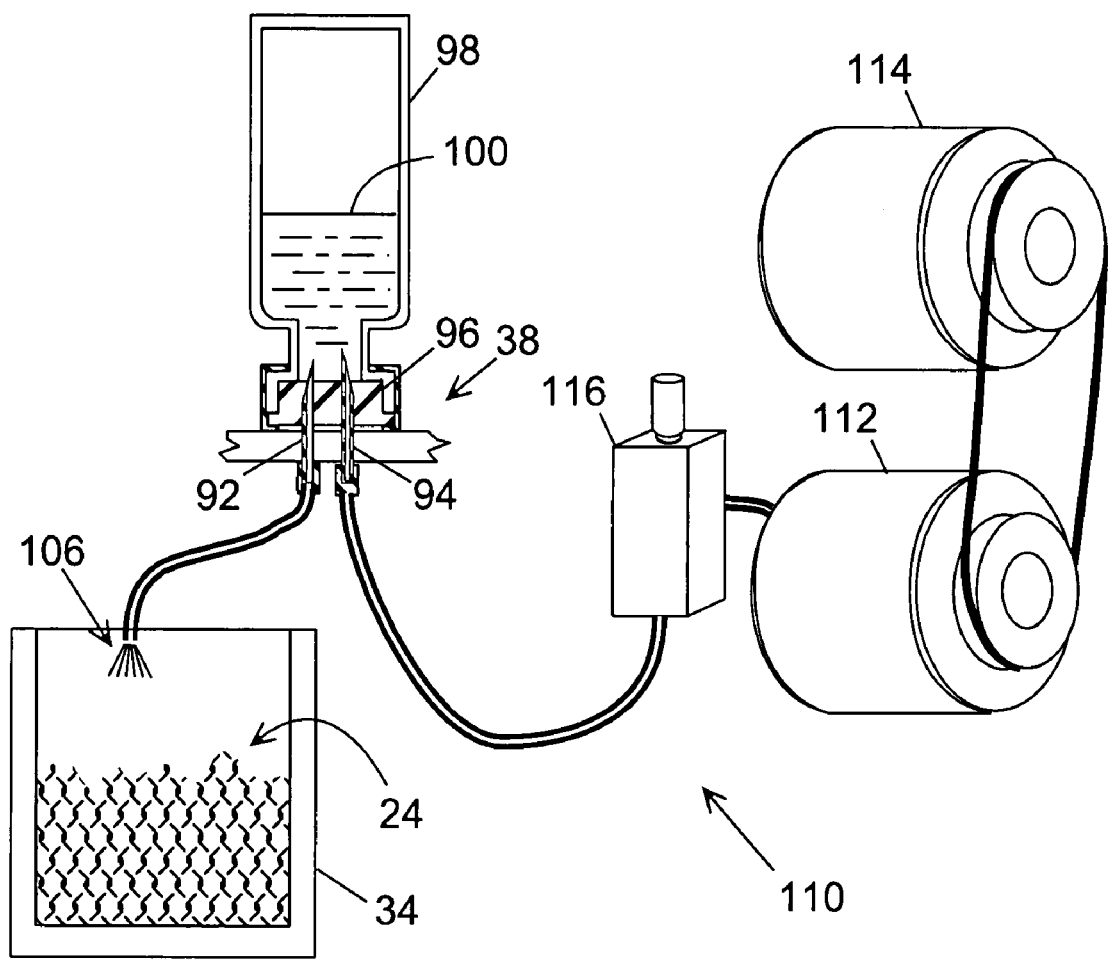
FIG. 6 is a schematic illustration of an alternative system for removing liquid medication from a vial.

The medication disposal system also preferably includes a system for facilitating the withdrawal of liquid medications from vials and aggregating the liquids with the disposal medium for disposal by burial or incineration. In the exemplary medication disposal system 20, an interface 38 suitable for engaging a vial of medicine is located on the front surface of the hog. Referring also to FIGS. 5 and 6, the interface of the liquid medication extraction system comprises a support for an upwardly projecting extraction tube 92 and an upwardly projecting vent tube 94. The extraction tube and the vent tube are hollow tubes, preferably having sharpened ends to penetrate an elastic stopper 96 that closes the end of a vial 98 of a liquid medication 100. The extraction tube and the vent tube pierce the stopper when a vial is pressed onto the interface. Referring to FIG. 5, in a liquid extraction system 90 the extraction tube is connected to a pump 102 by a conduit 104. When the pump is rotated by the crank 22 or by a motor, the medication is drawn out of the vial by the pump and expelled 106 into the disposal medium 24 in the container 34. The vent tube 94 is open to the atmosphere to enable air to enter the vial as the medication is withdrawn.

Referring to FIG. 6, in an alternative liquid extraction system 110, air pressurized by a compressor 112 driven by a motor 114 is introduced to the vial 98 through a vent tube 94. The pressure in the vial expels the liquid from the vial through the extraction tube 92 and into the disposal medium. A pressure control valve 116 controls the pressure of the air introduced to the vial.

The medication disposal apparatus renders surplus medications unusable and enables disposal with reduced risk to the environment and the persons involved in disposal. The medication is prepared for disposal by rending and aggregating with a disposal medium that is suitable for landfill burial and/or incineration. Following preparation, the aggregated mediation and disposal medium is buried or incinerated substantially reducing the risk of medical chemicals entering waterways.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. An apparatus for preparing a medication for disposal said apparatus comprising:
    (a) a hog comprising:
        (i) a first portion operable to rend a first medication by shredding; and
        (ii) a second portion operable to rend a second medication by crushing said second medication;
    (b) a container having portions defining an opening arranged to receive said first medication and said second medication riven by said hog; and
    (c) a quantity of a disposal medium located within said container and exposed to said riven medication passing through said opening, said disposal medium suitable for at least one of burial and incineration;
    (d) a vent tube penetrating a stopper of a vial for a liquid medication, said vent tube connected to a source of air at a pressure of at least one atmosphere; and
    (e) an extraction tube penetrating said stopper of said vial and permit the liquid medication in said vial to flow onto a surface of said disposal medium.

* * * * *